Patented July 21, 1953

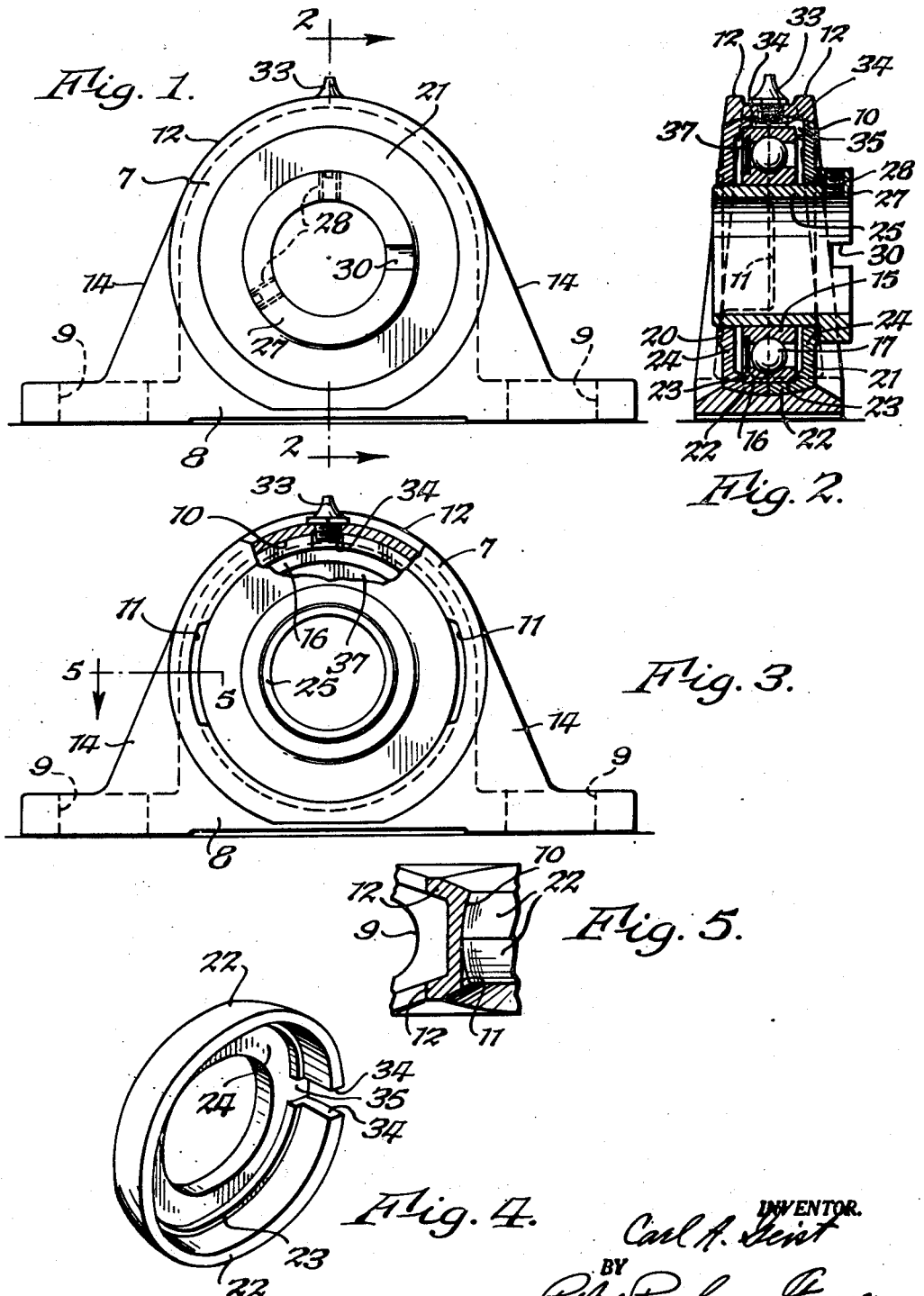

2,646,321

UNITED STATES PATENT OFFICE 2,646,321

BEARING ASSEMBLY

Carl A. Geist, Buffalo, N. Y.

Application August 23, 1949, Serial No. 111,810

6 Claims. (Cl. 308—187)

This invention relates to rotary anti-friction bearing assemblies of the type commonly used in connection with line shafting.

One of the objects of this invention is to provide a bearing assembly of this type which is constructed for use with standard anti-friction ball or roller bearings. Another object is to provide a bearing assembly of this type which includes a retainer formed of two halves which engage the outer race of an anti-friction bearing and the outer surfaces of which are formed to bear in a concave surface of a bearing shell or wall to permit the axis of the shaft to assume various angular positions. A further object is to provide a bearing assembly of this type in which the retainers also serve to retain the grease or lubricant in the bearing. A further object is to provide a bearing assembly of this type with a grease fitting which acts as a stop to limit the movement of the retainers with reference to the bearing shell. A further object is to provide a retainer of this type which is provided with a passage for supplying lubricant to the bearing. Other objects and advantages of this invention will appear from the following description and claims.

In the accompanying drawings:

Fig. 1 is an elevation showing one side of a bearing assembly embodying this invention.

Fig. 2 is a sectional elevation thereof, on line 2—2, Fig. 1.

Fig. 3 is an elevation, partly in section, of the other side of the bearing assembly.

Fig. 4 is a perspective view of one of the retainer rings removed from the bearing.

Fig. 5 is a fragmentary sectional plan view thereof, on line 5—5, Fig. 3.

The bearing assembly shown in the drawings illustrates by way of example one embodiment of this invention and includes a housing or pillow block including a substantially annular shell 7 having a base 8 which may be secured to any suitable or desired support, and which may have the usual openings 9 therein through which bolts or screws may extend for securing the housing to its support. As is common in some bearing assemblies of this type, the shell of the bearing is provided with an inner concave surface 10 which is preferably of substantially spherical curvature and the shell is provided with slots 11 which extend from one side of the shell to the concave inner surface of the shell, in such a manner as to be substantially tangent to the innermost portion of the concave inner surface 10. The outer surface of the shell may be of any suitable or desired form, that shown including a pair of ribs 12 at the opposite end portions of the shell and reinforcing webs 14 may be provided which connect the shell with the base 8. A shell of any other suitable or desired construction may be employed, if desired.

Bearing assemblies of this type have heretofore been provided with anti-friction bearings, such as roller bearings or ball bearings having the outer race provided with a convex or substantially spherical surface to fit within the inner surface of the bearing housing and bearings of this type have the objection that the anti-friction bearings, if worn out or broken, are sometimes difficult to replace, and are considerably more costly because the outer partly spherical surface of the outer race must be accurately formed. In accordance with my invention, I employ standard anti-friction bearings of the type which are readily available and which can be readily replaced, if broken or worn. The anti-friction bearing shown by way of example, includes an inner race 15, an outer race 16 and balls or rollers 17 arranged between the two races. In order to make it possible to adapt a standard bearing of this type to the shell or housing, I have provided a pair of rings 20 and 21, each of which has an annular flange 22 extending substantially in the direction of the axis of the bearing. The outer surfaces of these flanges of the rings are of convex or partly spherical curvature so that they may cooperate with the concave inner surface 10 of the bearing shell and the inner surfaces of the flanges 22 are formed to engage the outer surface of the outer race 16 of the anti-friction bearing and to be suitably secured thereto. This may be effected in any suitable or desired manner, and preferably the inner surfaces of the flanges 22 are so machined as to form a press fit with the outer surface of the outer race 16, so that the rings will frictionally grip the outer race. Preferably the inner surfaces of the axially extending flanges are provided with shoulders 23 which engage the ends of the outer race. Any other means for securing the retainer rings to the outer race may be provided.

The retainer rings also have inwardly or radially extending flanges 24 which extend along opposite sides of the anti-friction bearing in spaced relation thereto as determined by the shoulders 23. The inner surface of this flange has an internal diameter slightly larger than the internal diameter of the inner race 15, so that these flanges 24 will terminate in close proximity to any rotatable member on which the inner race is secured to protect the anti-friction bearing against entry of foreign materials and to retain lubricant in the bearing. Preferably I provide a sleeve or tubular member 25 which may receive a shaft or other member to be rotatably supported by the bearing, and the radial flanges 24 extend into close proximity to this sleeve. The sleeve is preferably secured to the inner race 15 of the bearing in any suitable manner. Preferably the sleeve has a press fit within the inner race. This sleeve is preferably provided with a flanged portion 27 at one end thereof provided with set screws 28 for securing the shaft or member to the sleeve. The flange 27 of the sleeve preferably also has a notch or recess 30 through which a pin (not shown) secured to the shaft may extend. In some cases, it may be desired to permit the shaft to move to a limited extent in the direction of its length in the sleeve, in which case the set screws need not be tightened and the pin, consequently, may move in the slot 30 sufficiently to permit such movement of the shaft, which may for example, be due to expansion and contraction of the shaft. The pin will, of course, prevent turning of the shaft relatively to the sleeve.

By means of the construction described, it will be obvious that the retainer rings, the anti-friction bearing and the sleeve when assembled, constitute a unit which may be readily assembled in the shell or removed therefrom by turning the unit about an axis extending transversely of the axis of the sleeve 25 to about 90 degrees, in such a manner that the unit may be passed through the slots 11 in the shell for either removing the unit from the shell or positioning the unit in the shell. When the unit is turned back through 90 degrees approximatey into the position shown, it will be obvious that the axis of the sleeve may be swung into various angular positions relatively to the shell, in which case, the outer concave surfaces of the retainer rings will move relatively to the concave inner surface of the shell, so that accurate alinement of the axis of the shaft with relation to the axis of the bearing shell need not be made.

The lubrication of the bearing may be effected through any suitable or desired lubricant fitting 33 which, in the construction shown, has a threaded engagement with an aperture in the upper portion of the shell 7 of the bearing assembly, and in accordance with this invention, this lubricant fitting serves the further purpose of limiting the movement of the bearing unit relatively to the shell. For this purpose, the flanges 22 of the retainer rings are provided with notches or cut-out portions 34 and the inner end of the lubricant fitting is formed to extend into these notches, as clearly shown in Figs. 2, 3 and 4, so that the swinging of the bearing unit within the shell is limited by the lubricant fitting. This fitting, consequently, prevents the parts of the bearing from accidentally becoming separated from each other during handling or shipment and the notches 34 together form a recess of sufficient size so as to permit the desired movement of the unit relatively to the shell, which may be necessary to compensate for misalinement of the bearing with the shaft.

Any lubricant discharged into the bearing through the fitting will be received in the recess formed by the notches 34 and in order to enable the lubricant to pass from the outer surface of the outer race to the space between the two races of the anti-friction bearing, one of the two rings is provided in the annular flange 22 thereof with a passage for the lubricant, such as a slit or recess 35, see Figs. 2 and 4.

Any suitable or desired means may be provided for resisting the discharge of lubricant from the side of the anti-friction bearing opposite to the slit or recess 35, and for this purpose, in the construction shown, the outer race 16 is provided with a grease retaining ring 37 of any suitable or well known type secured to one of the races and extending into close proximity to or into contact with the other race, so that this ring will serve to retain lubricant in the space between the two races of the anti-friction bearing.

The radial flanges 24 of the retaining rings also constitute a part of a labyrinth packing to retain lubricant in the anti-friction bearing. For this purpose, the inner surface of the radial flange 24 of the ring 20 cooperates with a peripheral portion of the sleeve 25, and the radially extending flange 24 of the other retainer ring 21 also cooperates with the periphery of the sleeve 25 and a portion of the outer surface of this flange cooperates with the flange 27 of the sleeve 25 to form a labyrinth passage which resists the flow of lubricant from the bearing. Since the lubricant flows into the anti-friction bearing along the inner surface of the ring 21, it is preferable to provide the flange 27 of the sleeve in contact with the radial flange of the ring 21 so that both the inner surface and the side surface of the ring 21 cooperate with the sleeve to resist the escape of lubricant. The other retainer ring 20 is not required to resist the flow of lubricant to the same extent as the retainer ring 21, for the reason that the ring 37 on the anti-friction bearing resists the flow of lubricant to the retainer ring 20. Any other means may be employed for retaining lubricant in the bearing.

In view of the construction described, it will be obvious that by the use of the retainer rings described, standard anti-friction bearings may be employed in my improved bearing assembly, and if the anti-friction bearing becomes damaged or broken, it can be readily replaced by another one by removing the retainer rings 20 and 21 out of engagement with the outer race, and then stripping the anti-friction bearing from the sleeve, whereupon another anti-friction bearing may be positioned on the sleeve and within the axial flanges of the retainer rings. The bearing described has the further advantage that it is readily adaptable to quantity production.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. In a bearing assembly comprising a base having an annular rigid one-piece wall, and an anti-friction bearing including inner and outer races with rolling members between said races, that improvement which includes a one-piece sleeve formed to receive the part to be supported by said bearing and on which said inner race is removably secured by a press fit, and a pair of retainer rings each having a press fit with the outer surface of said outer race and extending into dust-tight relation to said sleeve, the portions of said sleeve extending between said retainer rings and said inner race being imperforate, said annular wall having an inner partly spherical surface and said rings having their outer surfaces of partly spherical form to fit within said inner spherical surface of said annular wall.

2. In a bearing assembly comprising a base having an annular wall provided with an inner partly spherical surface, an anti-friction bearing including inner and outer races with rolling members between said races, that improvement which includes a pair of retainer rings each having an annular flange extending axially with reference to said bearing and encircling and secured to said outer race, the outer surfaces of said flanges being of partly spherical form to fit within said partly spherical inner surface of said annular wall, said annular wall having an aperture therein, a lubricant fitting extending through said aperture, and notches in said flanges of said rings and forming a recess into which the inner end of said fitting extends, and which is larger than the inner end of said fitting to permit limited movement of said rings relatively to said annular wall.

3. A bearing assembly according to claim 2, in which one of said rings has a passage formed therein extending from the notch therein around a side of said outer race to form a passage for lubricant from said notch to the space between said inner and outer races.

4. In a bearing assembly comprising a base having an annular wall provided with an inner partly spherical surface, an anti-friction bearing including inner and outer races with rolling members between said races, that improvement which includes a pair of retainer rings each having an annular flange extending axially with reference to said bearing and a radially extending annular flange, said rings being arranged with said axially extending flanges facing each other and having their inner surfaces encircling and frictionally gripping said outer race, and having their outer surfaces of partly spherical form to cooperate with the inner partly spherical surface of said annular wall, said annular wall having a hole therein, a grease fitting secured in said hole and extending beyond the inner surface of said annular wall, notches in said axially extending flanges of said rings forming a recess into which the inner end of said grease fitting may extend, said notches forming a recess larger than the inner end of said grease fitting to permit limited movement of said retainer rings relatively to said annular wall and a slit in one of said retainer rings connecting with a notch therein for conducting lubricant around a side of said outer race into the space between said races, said rings having radially extending flanges extending in spaced relation to the opposite ends of said anti-friction bearing to retain lubricant in said bearing.

5. In a bearing assembly comprising a base having an annular wall, and an anti-friction bearing including inner and outer races with rolling members between said races, that improvement which includes a one-piece sleeve formed to receive the part to be supported by said bearing and having one outer cylindrical surface on which said inner race is rigidly and removably secured, and a pair of retainer rings each having a radially extending flange and an annular flange at the outer portion of said radially extending flange and extending axially with reference to said bearing, said axially extending outer flanges of said rings being secured to said outer race and extending partly about the same, said radially extending flanges extending crosswise of the ends of said anti-friction bearing and into close proximity to said sleeve to form substantially dust-tight connections therewith, the portion of said sleeve extending between said radially extending flanges being imperforate, the outer surfaces of said axially extending flanges being mounted in said annular wall, said annular wall having an inner partly spherical surface and outer surfaces of said axially extending flanges having exterior partly spherical outer surfaces cooperating with the partly spherical surface of said annular wall, said annular wall having oppositely disposed slots which extend from one side of said wall to the part of largest diameter of said spherical surface of said annular wall to permit removal and replacement of said retainer rings and bearing in said annular wall.

6. A bearing unit for use in an annular one-piece wall of a base and including an anti-friction bearing having inner and outer races with rolling members between said races, a pair of retainer rings each having an annular flange extending axially with reference to said bearing and a radially extending annular flange at the outer portion of said axially extending flange, said rings being arranged with their axially extending flanges facing each other and secured by press fit to said outer race, and said radially extending flange extending across the ends of said anti-friction bearing and having an internal diameter slightly greater than the internal diameter of said inner race, a one-piece sleeve formed to be secured to a shaft and to which the inner race of said bearing is secured by a press fit, the inner portions of said rings extending into dust-tight relation to said sleeve, the portion of said sleeve which extends from the axially extending flange of one of said rings to the axially extending flange of the other ring being imperforate, said annular wall and said axially extending flanges being provided with substantially spherical cooperating surfaces for permitting the axis of said sleeve, together with said flanges and said bearing, to be adjusted angularly with reference to said annular wall.

CARL A. GEIST.

References Cited in the file of this patent

UNITED STATES PATENTS

| Number | Name | Date |
|---|---|---|
| 963,296 | Junggren | July 5, 1910 |
| 1,043,631 | Schmidt | Nov. 5, 1912 |
| 1,361,474 | Lippert-Bruenauer | Dec. 7, 1920 |
| 1,844,552 | Bailey | Feb. 9, 1932 |
| 2,048,972 | Scheffler | July 28, 1936 |
| 2,451,115 | Pew | Oct. 12, 1948 |

FOREIGN PATENTS

| Number | Country | Date |
|---|---|---|
| 139,208 | Great Britain | May 20, 1921 |